Feb. 17, 1931.                M. TOPP                  1,792,556
            DEVICE FOR THE MANUFACTURE OF FISHHOOKS
                    Filed June 22, 1927        3 Sheets-Sheet 1
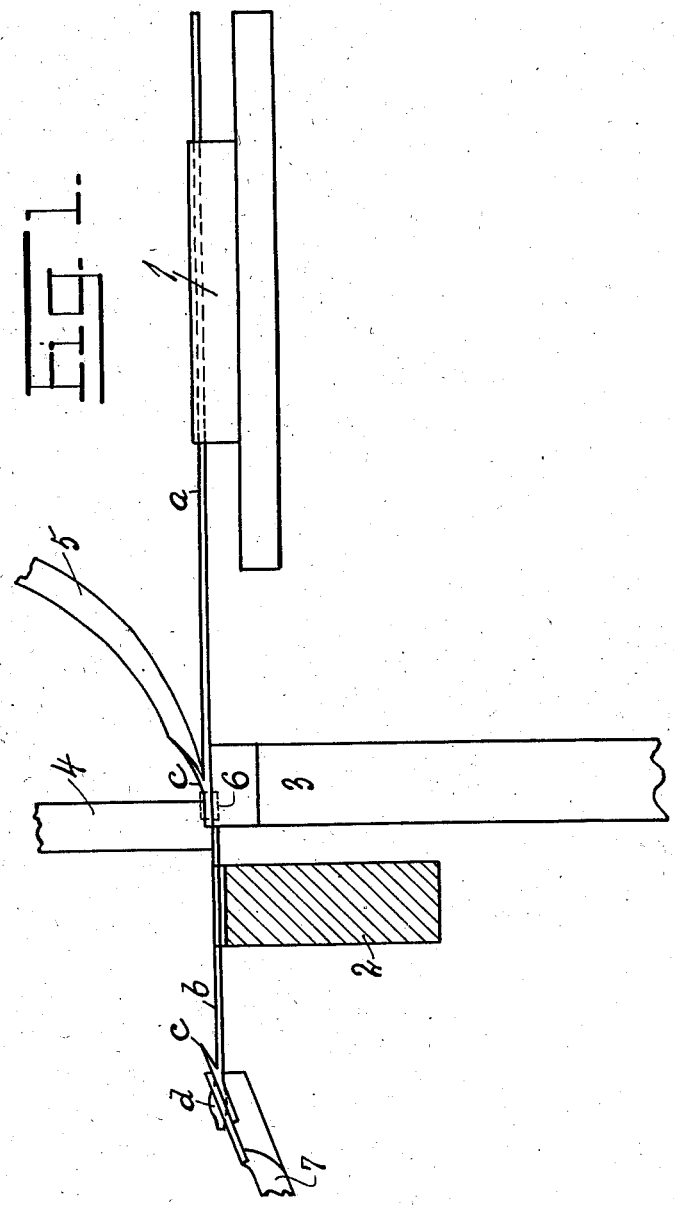
Inventor
Mathias Topp
By
    Atty.

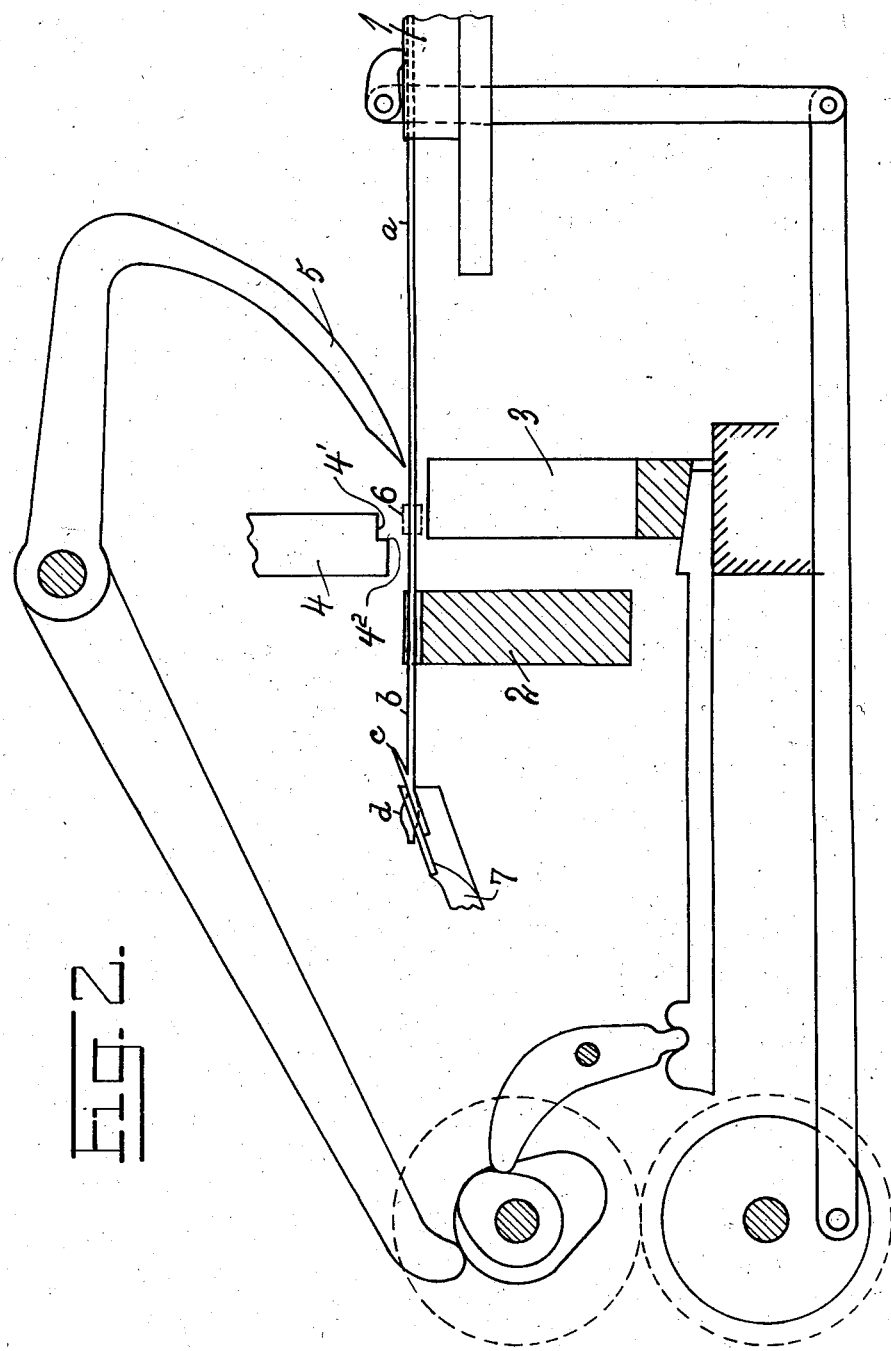

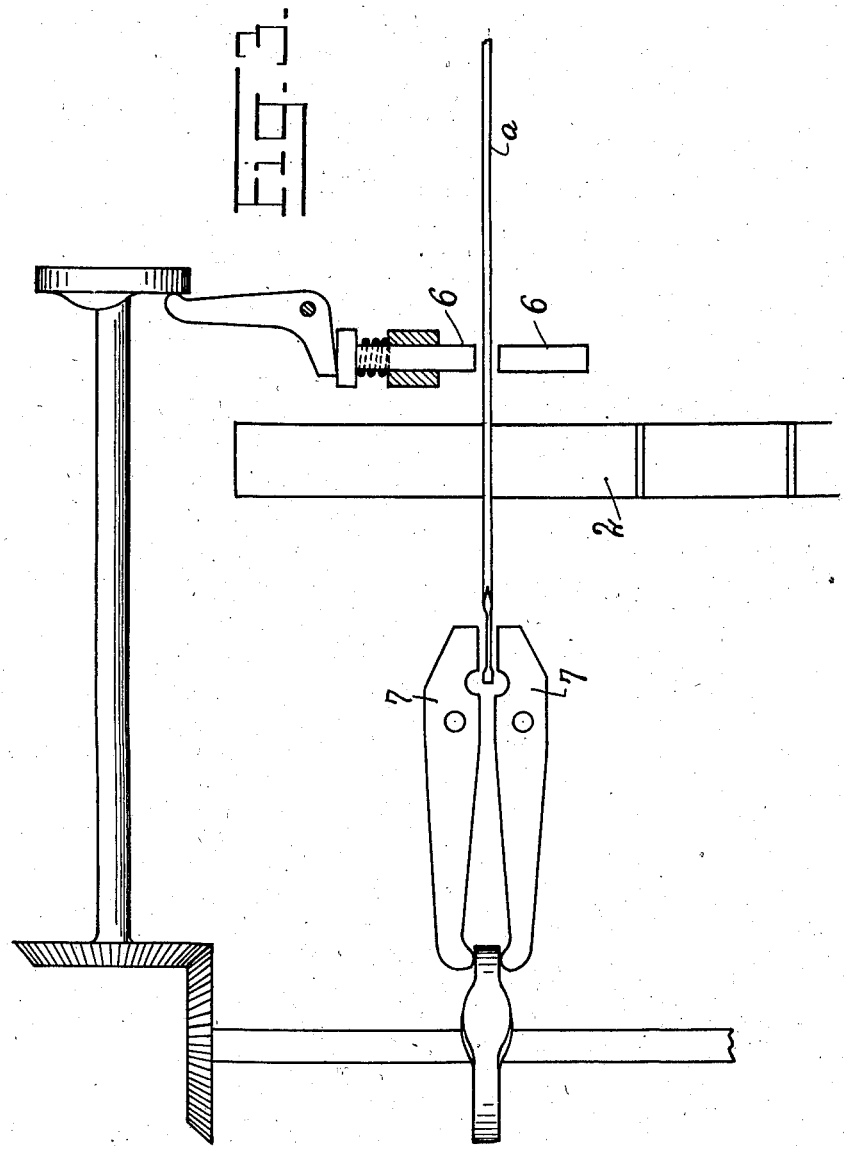

Patented Feb. 17, 1931

1,792,556

UNITED STATES PATENT OFFICE

MATHIAS TOPP, OF GJOVIK, NORWAY, ASSIGNOR TO O. MUSTAD & SON, OF OSLO, NORWAY

DEVICE FOR THE MANUFACTURE OF FISHHOOKS

Application filed June 22, 1927, Serial No. 200,681, and in Norway June 26, 1926.

In my patent application (Ser. No. 82,820, filed Jan. 21st 1926) is described a device by means of which the blanks in a machine for the manufacture of fishhooks are transported step by step from one tool to another, till the blank is formed into a finished hook. The said device, by means of which the blanks are moved sideways, may if desirable be combined with devices by means of which the wire, from which the blanks are cut by step is fed into the machine to be caught by the transporter; but is may also be used in such a way that the blanks, which are cut in another machine, are placed in the transporter be it by hand or by an automatic device.

The present invention relates to arrangements that are especially applied when the machine works as a fully automatic machine, viz, in which the cutting of the blanks from a continuous wire takes place in the machine provided with the transporter described in the above mentioned application or with an equivalent device.

According to the present invention the fishhook-blank is acted upon by several tools during the period of the manufacturing process in which it is transformed from an integral part of a continuous wire to a blank resting in the said transporter, so that the transporter takes hold of the blank for carrying it sideways only after the barb has been formed and the hook has been provided with a temporary or rough point.

In order to explain how this successive forming of the blank before it enters the transporter, is carried out, reference is made to the accompanying drawings, which show the wire in its different stages relatively to the transporter and the working tools, the constructional features of the latter being not shown.

Figure 1 is a diagrammatic view of a machine embodying my invention.

Figs. 2 and 3 are diagrammatic side and plan views, respectively, showing the means preferably used for actuating the hook forming and cutting tools.

In the drawing Figure 1, 1 represents the device by means of which the wire $a$ coming from a drum is fed into the machine. $b$ is a blank separated from the wire and resting in one of the notches of the transporter, ready to be carried laterally away. The transporter is designated by 2. 3 and 4 designate the combined cutters and clamping means, both of which have a vertical movement. The lower cutter 3 has a top face serving as a bed on which the end of the wire may rest. The lower end of the cutter 4 has an offset portion forming a clamping face 4' (Fig. 2) and a cutting edge $4^2$ the latter cooperating with one edge of the top face of the cutter 3 to sever a wire resting thereon. After severing the wire, the offset portion 4' operates in conjunction with said face to clamp the wire between them. In this position of parts the barb forming device comes in operation. This device is in the drawing designated by 5, and the drawing shows this knife after it has formed the barb. The said knife preferably has a curved form and a circular movement on an axis perpendicular to the plane of movement.

When the barb has been formed the two cutters move apart and that part of the blank which projects in front of the barb, is flattened by lateral pressure. This flattening means consists of two laterally movable dies, which are in the drawing indicated at 6. By this lateral pressing operation the foremost end of the blank will receive a shape as indicated at $d$.

When the end of the blank has been flattened in this manner the wire is by the feeding apparatus 1 carried forwards a suitable distance necessary to form a fishhook and the severing of the blank from the wire takes place as already described. The severed blank $b$ now rests in the notch of the transporter 2 in such position, that the flattened portion $d$ is placed between the jaws of a pair of shears 7. These jaws have an oblique position relatively to the wire and operate laterally. When these shears have done their work the point of the hook is roughly shaped and it needs only to be exposed to a grinding apparatus to receive its finished form.

Obviously this process for forming the point of the fishhook may be applied also in a separate machine from which the blank is taken in this stage of the manufacture and carried to another machine for having the other operations performed.

Figs. 2 and 3 show the mechanical means preferably employed for moving the just described tools, Fig. 2 being a drawing in the same plane as Fig. 1 with the tools 3 and 4 moved apart from each other to give place for the operation of the tool 6, and Fig. 3 being a plan view of the operative devices for moving the tool 7 and the tool 6.

Claims:

1. In a machine for making fish-hooks, the combination with a wire feeding device; of a barb cutter, and severing means comprising vertically movable members one of which has an off-set portion forming a cutting edge and a clamping face co-operating with the other member to clamp the wire during the operation of the barb cutter, and laterally operating flattening dies movable between the members when separated, to flatten the wire end beyond the barb.

2. In a machine for making fishhooks, the combination with means for feeding a wire step by step; of vertically movable members having cutting edges co-operating to sever the wire and clamping faces to hold the severed wire, a barb cutter acting on the wire held by said faces, laterally arranged members movable between the vertically movable members to flatten the wire beyond the barb when said vertically movable members are separated, a laterally movable transporter to receive the barbed and flattened wire, and laterally operated shears to diagonally cut the flattened portion from the barbed end of the wire.

In testimony whereof I have signed my name to this specification.

MATHIAS TOPP.